United States Patent [19]

Larson et al.

[11] Patent Number: 4,875,563
[45] Date of Patent: Oct. 24, 1989

[54] SHIFT LEVER ACTIVATED PARKING BRAKE

[75] Inventors: Scott A. Larson, Waterloo, Iowa; Duane R. Johnson, Wellington, Ohio

[73] Assignee: Deere & Company, Moline, Ill.

[21] Appl. No.: 145,343

[22] Filed: Jan. 19, 1988

[51] Int. Cl.$^4$ .............................................. B60K 41/26
[52] U.S. Cl. .................................. 192/4 A; 74/473 R; 180/271; 29/464
[58] Field of Search ...................... 192/4 A, 4 R, 4 C; 180/271; 74/473 R, 473 P; 29/157.1 R, 464

[56] References Cited

U.S. PATENT DOCUMENTS

| | | | |
|---|---|---|---|
| 1,909,377 | 5/1933 | Neveu | 192/4 A X |
| 2,725,129 | 11/1955 | Martin | 192/4 A |
| 2,910,156 | 10/1959 | Apple | 192/4 A X |
| 3,136,399 | 6/1964 | Granryd | 192/4 A |
| 3,635,317 | 1/1972 | Crabb et al. | 192/4 A |
| 3,843,206 | 10/1974 | Teagle | 180/271 X |
| 4,454,936 | 6/1984 | Wise | 192/4 A |
| 4,603,240 | 7/1986 | Hayasaki | 74/473 R X |

Primary Examiner—Rodney H. Bonck
Assistant Examiner—Richard M. Lorence

[57] ABSTRACT

A system for activating and de-activating a packing brake using only motion of the transmission gear shift lever. A mechanical linkage from the gear shift lever controlling the position of the cam. The cam in turn controls the position of a valve which can connect the spring-activated hydraulically deactivated parking brake to a source of pressurized fluid, or drain the brake. The cam is precisely positioned relative to the valve by a cam support structure, and the entire valve and cam mechanism preferably is mounted on the steering column near the gear shift mechanism. The preferred method for installing the apparatus in proper adjustment also is disclosed.

4 Claims, 2 Drawing Sheets

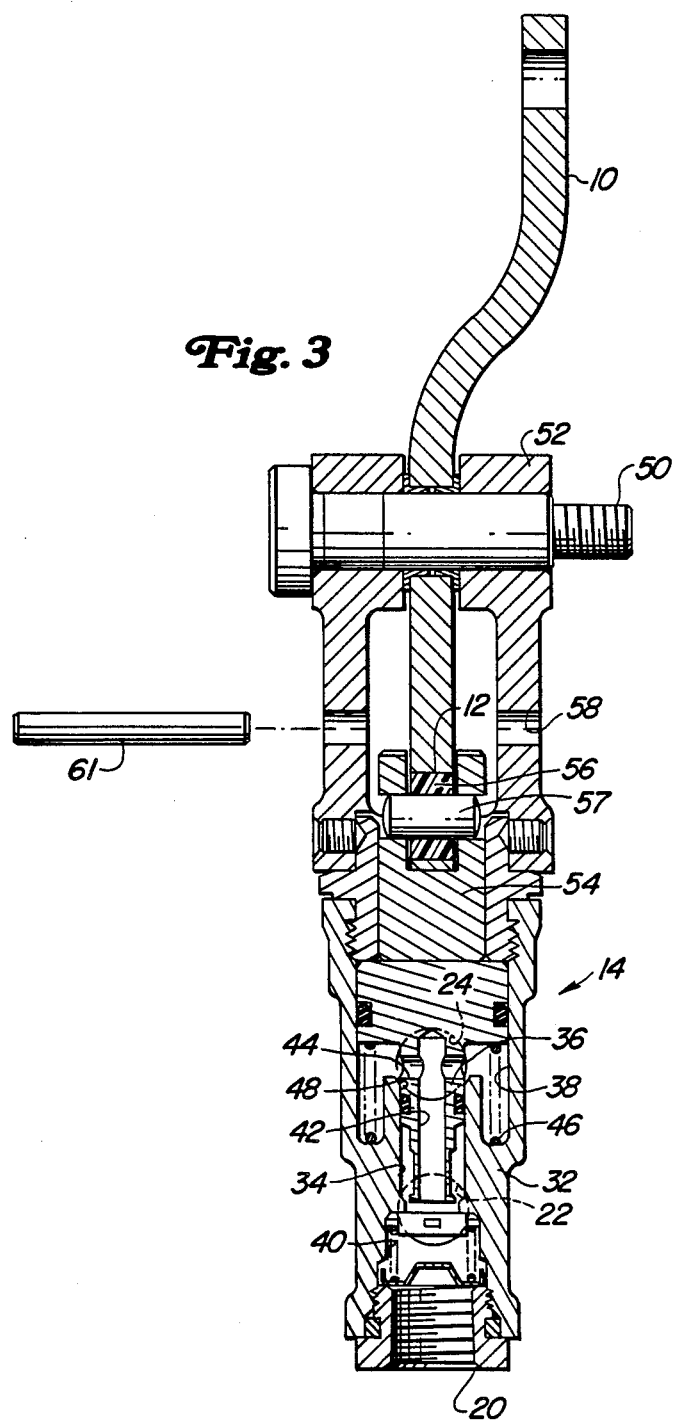

SHIFT LEVER ACTIVATED PARKING BRAKE

BACKGROUND OF THE INVENTION

1. Field of the Invention

The present invention relates to parking brakes for large vehicles, and particularly those actuable through motion of the shift lever for the transmission of the vehicle.

2. Description of the Related Art

In a conventional automatic transmission for an automobile the transmission is locked to prevent movement of the vehicle when the shift lever is in the PARK position. Normally, this is accomplished by having a park pawl engage some portion of the transmission to hold it stationary relative to the transmission housing.

Such a technique cannot easily be used with vehicles having a high gross vehicle weight (GVW). A park pawl normally is not strong enough to hold the vehicle in place. In addition, the higher the loading on a park pawl, the more difficult it is to disengage. Instead, the parking brake for the vehicle must be activated.

Conventionally, the parking brake is activated through some control mechanism, e.g., a pedal, lever or switch, entirely separate from the transmission shift lever. This generally does not pose a problem for professional drivers used to driving large vehicles, since they activate the parking brake as a matter of habit any time they are leaving the vehicle. Similarly, anyone who normally drives a vehicle with a manual transmission normally engages the parking brake whenever they leave the vehicle.

Real problems arise with the occasional driver of a large GVW vehicle who normally drives an automobile with an automatic transmission. Unless they live in a particularly hilly region, such people do not engage the parking brake as a matter of course. They simply rely on the park pawl in the transmission.

It therefore is desirable to employ some mechanism to automatically engage the parking brakes via movement of the transmission shift lever in a vehicle which may be driven by people who only infrequently drive high GVW vehicles. Typical examples of where such a mechanism would be desired include large recreational vehicles, such as motor homes, and large trucks for use by rental companies. Of course, it would also be more convenient even for professional drivers if their parking brake were engaged and disengaged automatically.

One such system for applying the parking brake via movement of the transmission shift lever is shown in FIG. 1. This system employs a spring-activated, hydraulically de-activated parking brake a controlled by a cable-operated valve b. The valve b is opened to reduce hydraulic pressure and allow the brake a to engage via a cable c connected to the transmission shift lever d. However, with this cable controlled valve b, a separate Bowden-type cable e is necessary to de-activate the parking brake a, and this necessitates a separate brake release control f on the vehicle. This has the disadvantage that the brake a must be released by a motion separate from moving the shift lever out of the PARK position. If the operator neglects to release the brake in this fashion, it may burn out.

SUMMARY OF THE INVENTION

Accordingly, it is the object of the present invention to provide a parking brake and control mechanism which engages and disengages the parking brake simply by movement of the transmission shift lever into and out of the PARK position, in the same fashion as a park pawl is applied and released in an automatic transmission for a lighter GVW vehicle.

This object is accomplished according to the present invention by employing a cam-operated control valve with a spring engaged, hydraulically disengaged brake. The cam preferably is pivotally mounted and connected by a mechanical linkage to the transmission shift lever. The cam surface has a generally smoothly curved surface for activating the valve (to deactivate the brake) whenever the transmission shift lever is moved away from the PARK position. A notch or detent is provided in the surface of the cam which will deactivate the valve (to activate the brake) when the transmission shift lever is moved into the PARK position. Preferably, the springs in the valve will be loaded so as to require minimal force to move the transmission lever into and out of the PARK position, and may even provide a slight assisting force to ensure full engagement in the PARK position.

BRIEF DESCRIPTION OF THE DRAWINGS

FIG. 3 is a cross-section of the valve of FIG. 2 along the lines 3—3 in FIG. 2.

DETAILED DESCRIPTION OF THE PREFERRED EMBODIMENTS

Figure 1:
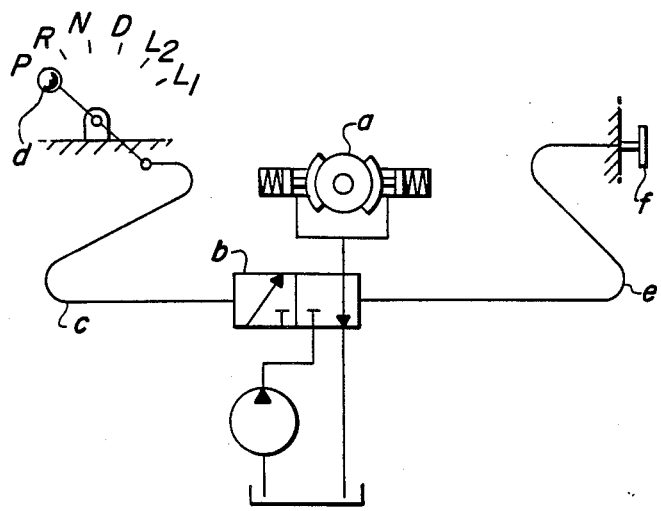
FIG. 1 is a schematic of a device according to the prior art.
Figure 2:
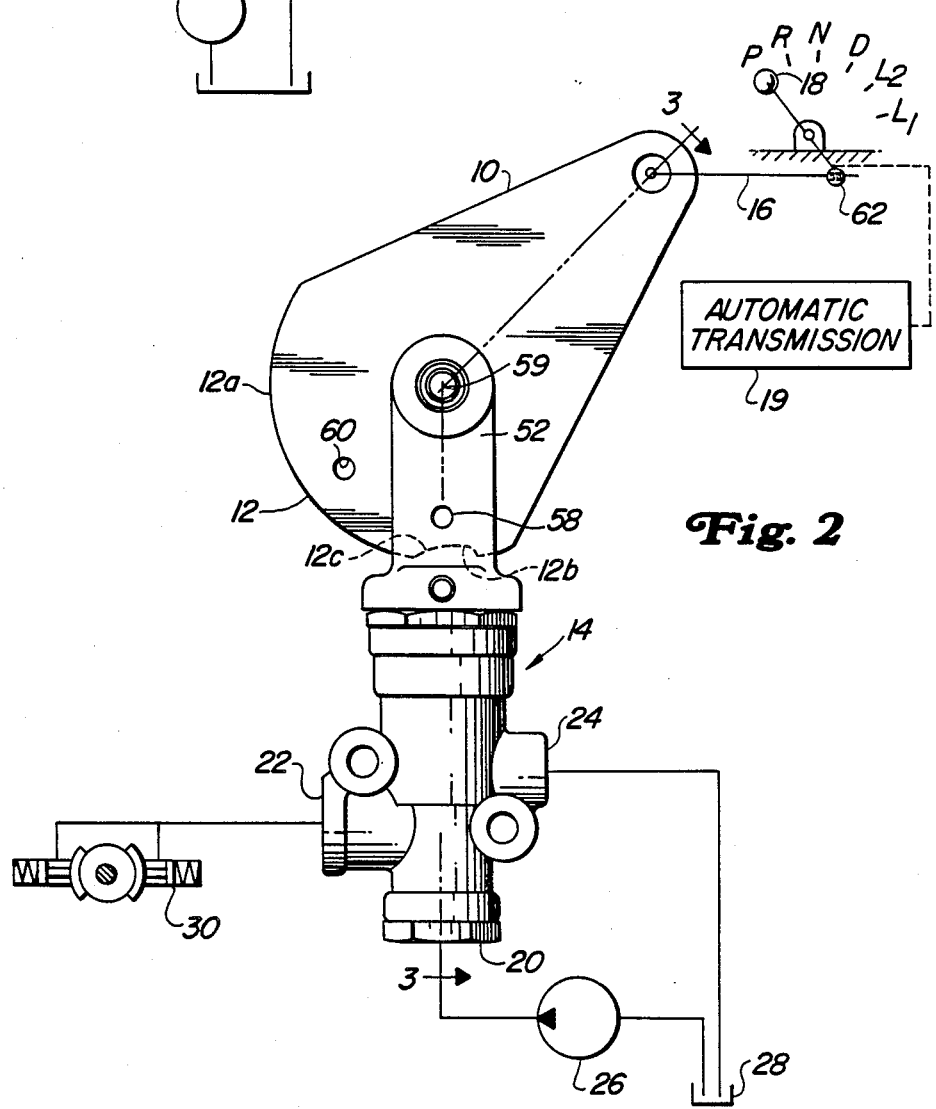
FIG. 2 depicts a cam-operated valve according to the present invention, schematically connected to relevant circuit components.

Referring to FIG. 2, the cam-operated valve according to the present invention has a cam 10, the cam surface 12 of which operates a valve 14. The cam 10 is connected via a direct mechanical linkage 16, e.g., a rod, to a gear shift lever 18 of an automatic transmission 19. The valve 14 has a supply port 20, a delivery port 22 and an exhaust port 24. The supply port 20 is connected to a source of pressurized fluid, shown here as a pump 26. The exhaust port is connected to a reservoir 28. The delivery port 22 is connected to provide fluid to release a spring-activated parking brake 30.

Referring to FIG. 3, the preferred valve for use in the present invention has a valve body 32 having a central bore 34 formed therein. One end of the bore 34 serves as the supply port 20. A spool 36 is positioned in the bore and divides the bore into an exhaust chamber 38 and a supply chamber 40. Passages 42, 44 formed in the spool 36 serve to interconnect the chambers 38 and 40 when the spool is in the position illustrated in FIG. 3, and the spool is biased towards this position by the spring 46. The spool 36 is movable downward against the force of the spring 46 into a position where the walls 48 of the central bore 34 will close off passage 44. The spool 36 then will completely block communication between chambers 38 and 40.

The supply port 20 and delivery port 22 open into the chamber 40. The exhaust port 24 opens into the chamber 38. Thus, pressurized fluid provided through the supply port 20 flows out through the delivery port 22 when the spool 36 is in a position closing off passages 44. This fluid is drained through the exhaust port 24, however, when the spool 36 is in a position leaving passages 44 open, as illustrated in FIG. 3.

Movement of the spool 36 is controlled by cam 10. The cam 10 is pivotally mounted via a pin 50 in a yoke 52 mounted to the top of the valve 14. A valve insert 54 rests against the top of the spool 36 and carries a cam follower 56 via a pin 57. The cam follower 56 is pressed against the cam surface 12 by the spring 46, and preferably is formed of some wear resistant material such as nylon or polytetraflouroethylene. It should be understood that while the valve insert 54 and spool 36 are shown here as separate pieces, they could be formed integrally.

Referring again to FIG. 2, it can be seen that the cam surface 12 has two distinct sections 12a, 12b. Section 12a is a substantially circular arc centered around the pivot point 59 of the cam. In contrast, section 12b has a smaller radius than section 12a, and appears generally as a notch on the surface 12 of the cam 10. The cam surfaces 12a, 12b and the mechanical linkage 16 to the shift lever 18 are so configured that when the shift lever 18 is in any position other than PARK, the cam follower 56 will be pressing against surface 12a. The radius of this surface is such as to push the spool 36 down to seal off passages 44. Fluid then is supplied to the delivery port 22 to release the parking brake 30. When the shift lever 18 moves into the PARK position, the cam follower 56 will press against the surface 12b. The smaller radius of this surface allows the spool 36 to move upwards in the valve body into the position shown in FIG. 3, opening passage 44. This drains the fluid in the system to the exhaust port 24, allowing the parking brake 30 to close, i.e., activate.

Providing a gradual move into the notch 12b as shown in FIG. 2, rather than a step notch, helps ensure positive engagement of the parking brake. If the shift lever is moved to an area on the ramped portion 12c, spring 46 will ensure that the cam follower 56 is forced all the way down to the bottom of the notch 12b.

As may be seen, with the cam activator arrangement according to the present invention, activation and de-activation of the parking brake by the operator requires no action other than moving the gear shift lever into and out of PARK. It therefore will appear no different to the operator than if a park pawl were being used.

In use, fairly precise tolerances are required for proper positioning of the cam and valve spool relative to one another to ensure proper operation. Mounting of the cam directly to the valve via a yoke helps ensure this proper positioning. To operate correctly, however, the connection between the shift lever and the cam also must be adjusted properly, and another feature of the present invention is a technique for allowing correct adjustment.

According to this further feature of the present invention, the yoke 52 and cam 10 each are provided with alignment holes 58, 60. To install the apparatus on a vehicle, the alignment holes 58, 60 are aligned and a pin 61 is placed through them to hold the cam in a position corresponding to a predetermined gear selection, e.g., DRIVE. The valve and cam then are mounted to the vehicle, preferably near the shift lever, e.g., on the steering column, to minimize play in the mechanical linkage 16. The gear shift lever 18 is shifted into the pre-selected position, i.e., DRIVE. Only then is the mechanical linkage 16 between the cam 10 and gear shift lever 18 connected. The length of mechanical linkage 16 is adjustable, e.g., by a nut 62, so that with the cam 10 and gear shift lever 18 in their predetermined positions, the linkage 16 can be adjusted to connect them. The pin used to hold the alignment holes 58, 60 in place then is removed and the system is in proper adjustment.

While the present invention has been described with reference to particular embodiments thereof, it should be understood that one of ordinary skill in the art could readily modify various aspects of these embodiments without exceeding the scope of the invention. For example, while a particular valve 14 has been described herein, alternative valves could easily be employed. In addition, the cam surface can be formed by track, so that the cam can both push and pull the cam follower. Accordingly, the scope of the present invention is intended to be limited only by the following claims.

We claim:

1. A system for activating and de-activating a parking brake, comprising:
   a spring-activated, hydraulically de-activated parking brake;
   a valve having a first position connecting said brake to a source of pressurized fluid to deactivate said brake and a second position draining fluid from said brake to activate said brake, said valve being biased towards said second position, and said valve comprising:
   (i) a valve body having a central bore formed therein;
   (ii) a spool in said valve body separating said central bore into first and second chambers, said spool having a passage formed therein for connecting said chambers when said valve is in said second position, said passage being blocked off by walls of said bore when said valve is in said first position;
   (iii) a first port connecting said first chamber to a drain for hydraulic fluid;
   (iv) a second port connecting said second chamber to said source of pressurized fluid; and
   (v) a third port connecting said second chamber to said brake;
   cam follower means for controlling the position of said valve;
   a cam having a cam surface for controlling the position of said cam follower means;
   cam support means for holding said cam in a predetermined position relative to said valve, whereby said cam follower and cam surface are precisely positioned;
   an automatic transmission having a PARK position and at least one other position;
   a gear shift lever for moving said automatic transmission between said PARK position and said at least one other position; and
   a mechanical linkage interconnecting said gear shift lever and said cam, whereby movement of said gear shift lever causes proportional movement of said cam, said cam surface being shaped to cause said cam follower to move said valve to said second position when said gear shift lever is moved to said PARK position, and to said first position when said gear shift lever is moved to any other position.

2. The system of claim 1, wherein said cam support means comprises a yoke mounted to an end of said valve, said cam being pivotally mounted to said yoke.

3. The system of claim 2, wherein said cam surface has a first section and a second section, said first section being substantially arcuate, centered around the pivot point of said cam, and serving to position said valve to connect said source of pressurized fluid to said brake, and said second section having a radius less than said first section and serving to position said valve to drain said brake.

4. A method of assembling a system for activating and de-activating a parking brake having:
- a spring-activated, hydraulically de-activated parking brake;
- a valve having a first position connecting said brake to a source of pressurized fluid to deactivate said brake and a second position draining fluid from said brake to activate said brake, said valve being biased towards said second position;
- cam follower means for controlling the position of said valve;
- a cam having a cam surface for controlling the position of said cam follower means;
- cam support means for holding said cam in a predetermined position relative to said valve, whereby said cam follower and cam surface are precisely positioned;
- an automatic transmission having a PARK position and at least one other position;
- a gear shift lever for moving said automatic transmission between said PARK position and said at least one other position; and
- a mechanical linkage interconnecting said gear shift lever and said cam, whereby movement of said gear shift lever causes proportional movement of said cam, said cam surface being shaped to cause said cam follower to move said valve to said second position when said gear shift lever is moved to said PARK position, and to said first position when said gear shift lever is moved to any other position;

the method comprising:
- forming a first alignment bore in said cam support means;
- forming a second alignment bore in said cam at a position therein such that when said first and second alignment bores are aligned, said cam is in a position corresponding to a predetermined position of said gear shift lever;
- aligning said alignment bores and inserting a pin therethrough to hold said cam and cam support in fixed positions relative to each other;
- placing said gear shift lever in said predetermined position;
- adjusting a length of said mechanical linkage to the appropriate length to interconnect said cam and said gear shift lever while in said positions, and interconnecting the same; and
- removing said pin from said bores.

* * * * *